United States Patent [19]

Saeki et al.

[11] Patent Number: 4,921,236
[45] Date of Patent: May 1, 1990

[54] RECYCLING AUTOMATIC DOCUMENT FEEDER

[75] Inventors: Sirou Saeki; Sunao Ikeda, both of Yokohama; Hirohisa Otsuka, Kawaguchi; Nobuyuki Yanagawa, Chigasaki, all of Japan

[73] Assignee: Ricoh Company, Ltd., Tokyo, Japan

[21] Appl. No.: 294,904

[22] Filed: Jan. 4, 1989

Related U.S. Application Data

[63] Continuation of Ser. No. 58,882, Jun. 5, 1987, abandoned.

[30] Foreign Application Priority Data

Jun. 5, 1986 [JP] Japan .................................. 61-129107
Jul. 7, 1986 [JP] Japan .................................. 61-103085
Jul. 30, 1986 [JP] Japan .................................. 61-115996
Sep. 1, 1986 [JP] Japan .................................. 61-205332

[51] Int. Cl.$^5$ ............................................. B65H 5/06
[52] U.S. Cl. ................................... 271/3.1; 271/186; 271/291; 271/301; 271/902

[58] Field of Search ................. 271/3.1, 291, 902, 186, 271/301

[56] References Cited

U.S. PATENT DOCUMENTS

| | | | |
|---|---|---|---|
| 4,419,007 | 12/1983 | Kingsley | 271/3.1 X |
| 4,457,506 | 7/1984 | Ashbee | 271/3.1 |
| 4,469,436 | 9/1984 | Jones | 271/301 X |
| 4,579,326 | 4/1986 | Pinckney | 271/3.1 |
| 4,627,709 | 12/1986 | Kitajima et al. | |
| 4,723,772 | 2/1988 | Honjo | 271/3.1 |
| 4,815,722 | 3/1989 | Sugimoto | 271/3.1 |

*Primary Examiner*—Richard A. Schacher
*Attorney, Agent, or Firm*—Oblon, Spivak, McClelland, Maier & Neustadt

[57] ABSTRACT

A recycling automatic document feeder usable with an electronic copier and others includes a reversing section for feeding a document to a glass platen of the copier while turning it over. The document feeder adapts itself to a single-face and a double-face copy mode as well as to a document through type and an optical scan type exposing system.

2 Claims, 12 Drawing Sheets

RECYCLING AUTOMATIC DOCUMENT FEEDER

This application is a continuation of application Ser. No. 07/058,882, filed on June 5, 1987, now abandoned.

FIELD OF THE INVENTION
BACKGROUND OF THE INVENTION

The present invention relates to a recycling automatic document feeder usable with an electronic copier and other image-forming apparatus and, more particularly, to a recycling automatic document feeder having a capability of sequentially and repetitively feeding a stack of original documents to a glass platen of a copier and a document feeding capability which is adaptive to double-face copying.

DESCRIPTION OF THE BACKGROUND

A recycling automatic document feeder is known in the art in which a stack of documents loaded on a platform are sequentially and automatically fed to be scanned for exposure and, then automatically collected on the platform to repeat such a process, as disclosed in Japanese Patent Laid-Open Publication No. 60-102342 by way of example. The disclosed prior art automatic document feeder is characterized in that a photoconductive element is exposed to a document image while a document is moved relative to exposing optics, i.e., a so-called document through system. This kind of exposing system is advantageously applicable to a case wherein a great number of copies are produced from each of a plurality of documents. Besides the document through type exposing system, an optical scan type exposing system is known in which an optical exposing unit is moved relative to a document. When applied to an automatic document feeder, the optical scan system allows a number of copies to be produced from the same document more rapidly. However, none of the prior art recycling automatic document feeders is capable of practicing both of the document through system and the optical scan system and selecting either one of them as desired.

Meanwhile, there has been proposed a copier which is selectively operable in a single-face and a double-face copy mode and, in the double-face mode, performs recycle (repeat) copying with a set of documents or copying each of a set of documents only once as desired. This type of copier is furnished with a recycling automatic document feeder which adapts itself to double-face copying, as disclosed in, for example, Japanese Patent Laid-Open Publication (Kokai) Nos. 59-216160 and 59-218464. A problem with such prior apparatus is that the document transport loop which is provided for double-face copying is extremely complicated and, therefore, requires a prohibitively complicated loop changeover control and, in addition, the whole document feeder becomes bulky.

Further, any of the recycling automatic document feeders stated above includes a document separating and feeding device adapted to separate documents fed from a platform one by one to feed it them to a glass platen of a copier. This kind of document separating and feeding device may be represented by one in which a separating section is implemented with a staggered roller pair. In the staggered roller pair scheme, the nipping width (i.e., the width over which a document makes contact with the peripheral surface of each roller) is determined by the meshing amount of the rollers. Hence, should the nipping width be small, simultaneous feed of more than one document would not be prevented positively; should the nipping amount be large, the contact pressure acting between the rollers and the document would be increased to contaminate or even damage the document.

Another document separating and feeding device known in the art uses a staggered belt pair. This alternative prior art scheme allows the separating section to extend over a substantial width and, therefore, to separate a document to a certain degree even if the meshing amount is relatively small, preventing even a thin document from being contaminated or damaged. Nevertheless, when it comes to a relatively thick document, the belts are apt to cause simultaneous feeding of more than one document as well as jamming. Another drawback with the belt scheme is that a greater number of structural elements are required for driving belts than for driving rollers. In addition, extra measures for protecting the belts against displacement and slacking are needed.

OBJECTS OF THE INVENTION

It is therefore an object of the present invention to provide a recycling automatic document feeder which accommodates not only the document through system but also the optical scan system to enhance efficient production of copies.

It is another object of the present invention to provide a recycling automatic document feeder adaptive to double-face copying in which a document reversing section for turning over a document is built in a unique manner to reduce the overall dimensions of the document feeder while enhancing efficient document transport.

It is another object of the present invention to provide a document separating and feeding device which separates a document positively and, yet, prevents a document from being contaminated or damaged.

SUMMARY OF THE INVENTION

A recycling automatic document feeder having a capability of automatically feeding an original document laid on a platform to an exposing station and, then, automatically collecting the document on the platform to repeat such process of the present invention comprises a separating means for sequentially separating original documents stacked on the platform one by one while turning over the document separated, a first transporting means for transporting the document separated by the separating means to an intermediate stop section, a second transporting means for advancing the document from the intermediate stop section to an exposing section and driving out of the exposing section any of the documents which served exposure, a reversing means for turning over the document driven out of the exposing section by the second transporting means, toward the platform, a third transporting means for transporting the document turned over by the reversing means toward the platform, and a document one round sensing means for sensing the end of one round of transport of the documents.

In accordance with the present invention, a recycling automatic document feeder usable with an electronic copier and others includes a reversing section for feeding a document to a glass platen of the copier while turning it over. The document feeder adapts itself to a single-face and a double-face copy mode as well as to a document through type and an optical scan type exposing system.

The above and other objects, features and advantages of the present invention will become more apparent from the following detailed description taken with the accompanying drawings.

DESCRIPTION OF THE PREFERRED EMBODIMENTS

The First Embodiment

Figure 1:
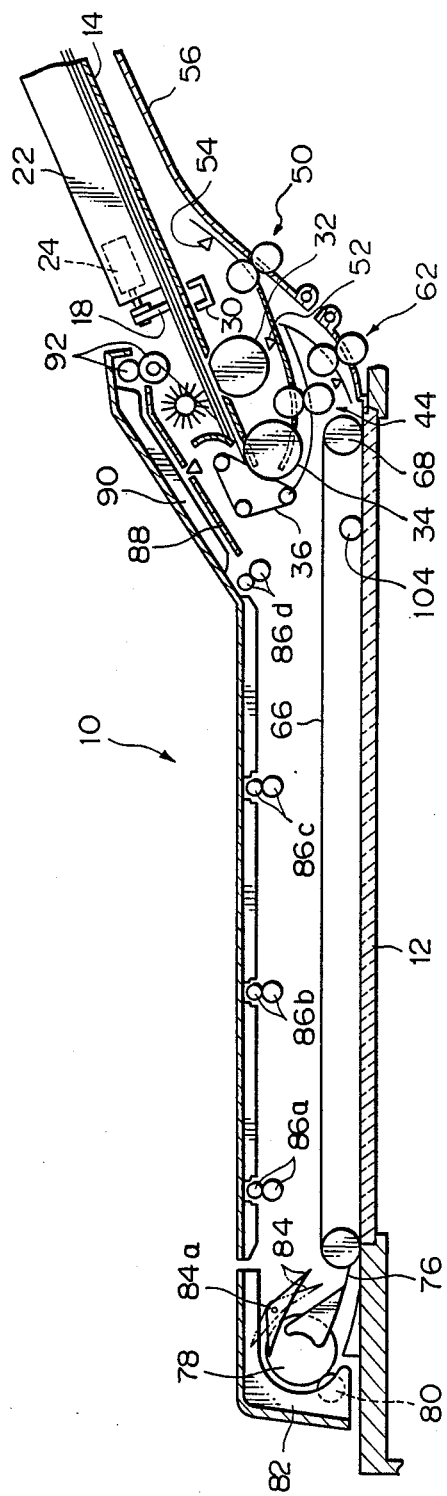
FIG. 1 is a sectional view showing a first embodiment of a recycling automatic document feeder in accordance with the present invention.
Figure 2:
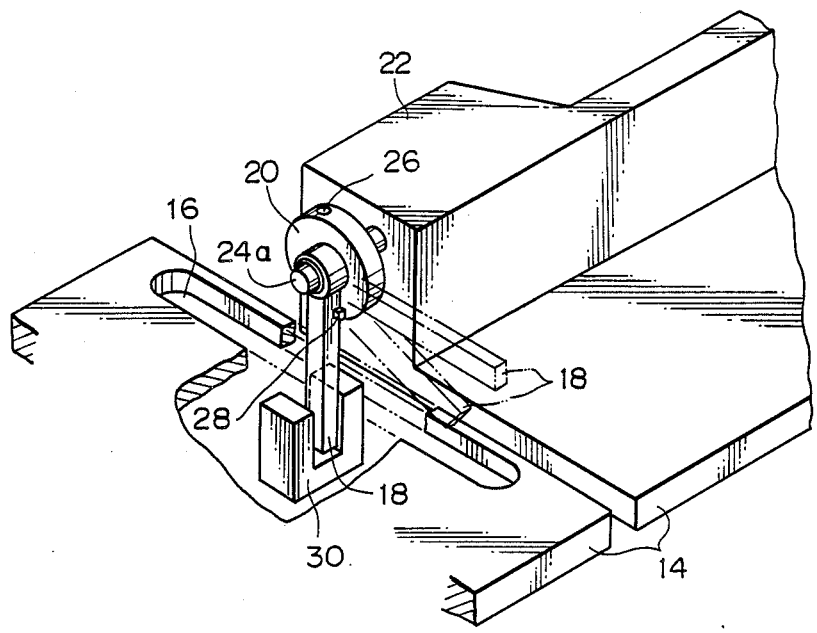
FIG. 2 is an enlarged perspective view of an essential part of the document feeder as shown in FIG. 1.
Figure 3:
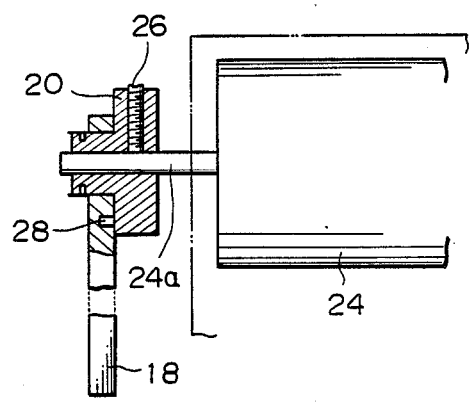
FIG. 3 is a sectional view side elevation showing the essential part of FIG. 2.

Referring to FIG. 1 of the drawings, a recycling automatic document feeder embodying the present invention is shown and generally designated by the reference numeral 10. As shown, the automatic document feeder 10 is mounted on a copier, which belongs to a family of image-forming apparatus, in such a manner as to lie above a glass platen 12. Although not shown in the figure, a photoconductive drum, an optical unit for exposure, a fixing unit, a paper feed device and others are arranged below the glass platen 12 as in an ordinary electrophotographic copier. A platform 14 to be loaded with documents is located at the right end of the glass platen 12 and inclined rightwardly upward by about 30 degrees relative to the horizontal. This inclination is adapted to allow a returned document to be advanced smoothly by gravity to a separating means, which will be described. As shown in FIG. 2, the platform 14 is provided with an elongate slot 16 while a separating plate 18 is so positioned as to be received in the slot 16. Specifically, as shown in FIG. 3, the separating plate 18 is freely rotatably engaged at its base end with a boss 20 which is in turn fixed to an output shaft 24a of a motor 24 by a set screw 26. The motor 24 is mounted on a side fence 22 of the document feeder 10. A pin 28 is studded on the boss 20 so that, as the boss 20 is rotated, the pin 28 interferes with the separating plate 18 to urge it upward (see FIG. 4).

As shown in FIG. 2, a photosensor 30 made up of a light emitting element and a light sensitive element is located in such a position that when the separating plate 18 becomes perpendicular due to gravity, the free end of the plate 18 is positioned between the light emitting and light sensitive elements. The photosensor 30, therefore, senses that the separating plate 18 is dropped in the slot 16. In the event of a copying operation, original documents are stacked on the platform 14 and, so long as the documents are present on the platform 14, the free end of the separating plate 18 rests on the stack of documents due to gravity without dropping into the slot 28. As the copying operation proceeds until the final document has been fed from the platform 14, the separating plate 18 loses the support and, therefore, drops into the slot 16 due to its own weight. Then, the photosensor 30 senses the drop of the separating plate 18 into the slot 16, i.e., one round of the document feed.

Figure 4:
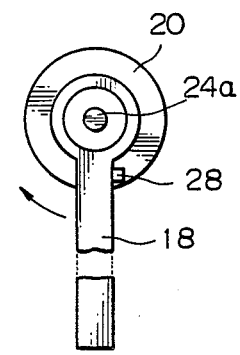
FIG. 4 is a front view of a separating plate of FIGS. 2 and 3.

In response to the resulting output of the photosensor 30, the motor 24 is rotated so that the pin 28 studded on the boss 20 moves the separating plate 18 upward as indicated by an arrow in FIG. 4. When the separating plate 18 is moved by substantially more than 180 degrees away from the photosensor 30, the motor 24 is deenergized. This causes the separating plate 18 to drop by gravity in the same direction as before, resulting in the plate 18 resting on the documents which have already been collected on the platform 14.

In this sense, the separating plate 18, boss 20, photosensor 30 and others constitute an exemplary means for sensing one round of document feeding.

Figure 5:
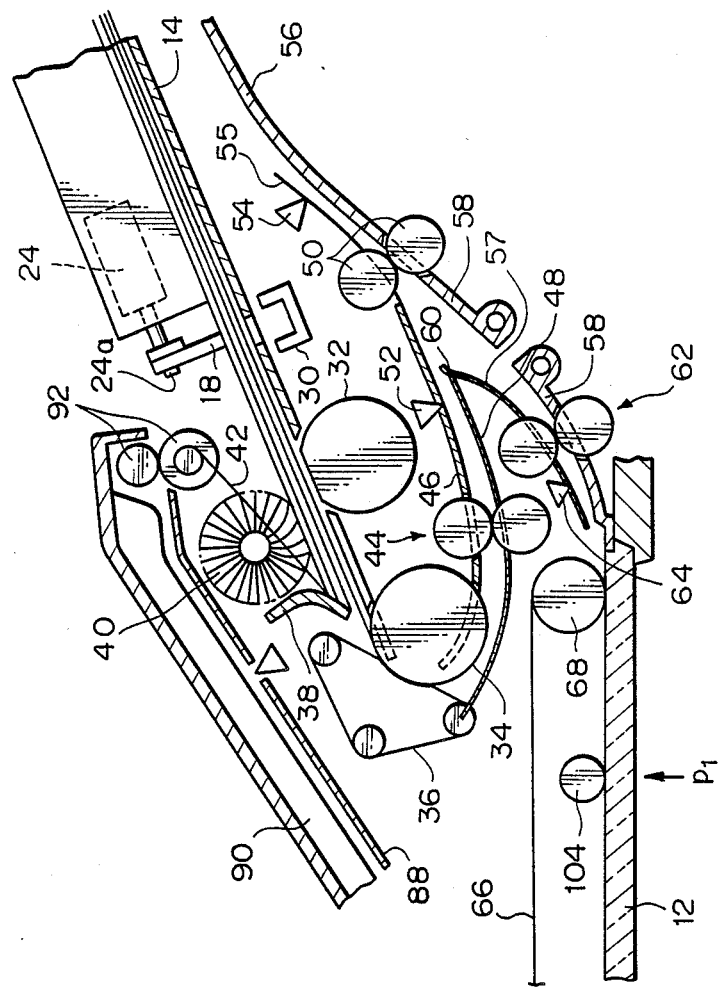
FIG. 5 is a fragmentary sectional view side elevation of the document feeder as shown in FIG. 1.

The separating means previously mentioned is adapted to sequentially separate the documents on the platform 14 one by one while turning over each of the documents. As shown in FIG. 5, the separating means generally consists of a feed roller 32, a separating roller 34, a blocking belt 36, an inlet plate 38, and a drive system associated therewith. Specifically, the feed roller 32 is made of sponge having a coefficient of friction of 1.0 and provided with a generally crescent-shaped cross-section. The feed roller 32 is rotatably disposed below and adjacent to the lower end of the platform 14. The separating roller 34 is located at the lower end of the platform 14. The blocking belt 36 is pressed against the separating roller 34 by a spring, not shown, the nipping portion of the belt 36 and roller 34 having a substantial length to facilitate separation. The inlet plate 38, which comprises an angled plate, serves to retain the documents at one of its inclined surfaces, so that the documents may be sequentially fed to a position between the separating roller 34 and the blocking belt 36, the lowermost one first. A brush roller 40 and an inlet Myler film 42 are disposed ahead of the inlet plate 38 with respect to the intended direction of document feed, the brush roller 40 enhancing positive document feed and the inlet Myler film 42 preventing the documents from floating.

An electromagnetic clutch, not shown, is connected to each of the separating roller 34 and feed roller 32 so as to cause them to perform one rotation every time one document is to be fed. A one-way clutch, not shown, is built in the separating roller 34 in such a manner that, after the one rotation, the roller 34 is rotated by the document which has then been nipped by a pair of pull-out rollers 44, which exert a driving force.

The document is advanced through between first guides 46 and 48 and in due course is caught by a pair of auxiliary rollers 50. A sensor 52 is positioned between the pull-out rollers 44 and the auxiliary rollers 50 so as to control the reversible rotating direction of the auxiliary rollers 50. Second guides 55 and 56 are provided in an obliquely upward position relative to the auxiliary rollers 50, defining an intermediate stop section. Disposed in this intermediate stop section is a sensor 54 responsive to the trailing end of a document which is advanced toward an exposing station.

The pull-out rollers 44, the auxiliary rollers 50 adapted to drive a document toward the intermediate stop section, and their associated drive systems constitute a first transport means for transporting a document, which is separated by the separating means, to the intermediate stop section.

A document passage which is defined by third guides 57 and 58 is provided below and branches off the passage which is defined by the first guides 46 and 48. The branching point of the passage as defined by the third guides 57 and 58 is located substantially at the intermediate position between the pull-out rollers 44 and the auxiliary rollers 50 and adjacent to and at a higher level than the sensor 52. A tongue 60 extends toward the first guide 46 at the above-mentioned branching point so as to change over the path which a document is to follows. The passage defined by the third guides 57 and 58 terminates at the glass platen, or exposing station, 12 with a pair of regist rollers 62 and a regist sensor 64 disposed one after another therein. A document transport belt 66 is located above and in the vicinity of the glass platen 12.

The belt 66, regist rollers (not shown) 62, auxiliary rollers adapted to feed a document toward the glass platen 12, and others constitute a second transport means for transporting a document from the intermediate stop position to the exposing station and for feeding out a document which served the exposure.

Figure 6:
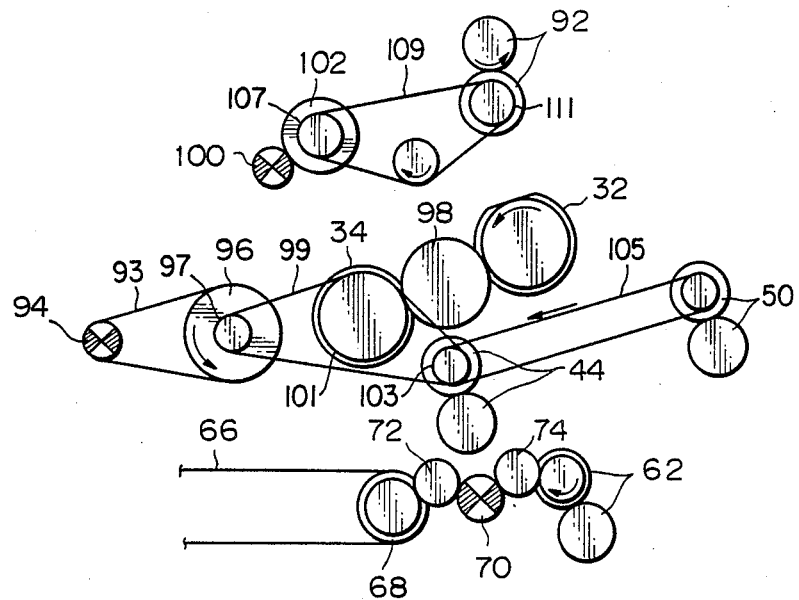
FIG. 6 is a schematic view of a power transmission system.

As shown in FIG. 1, the belt 66 is implemented with a single endless belt as in an ordinary automatic document feeder. As shown in FIG. 6, a drive pulley 68 which is located at the right end of the belt 66 is reversibly rotated and stopped by an output shaft 70 of a DC servo motor which serves to drive the regist rollers 62 also. The transmission of output torque of the motor shaft 70 is effected by intermediate wheels 72 and 74 such as gears or friction wheels, as shown in FIG. 6. As shown in FIG. 1, at the left end of the belt 66, a Myler film 76 is pressed against the belt 66 to prevent a document from being caught and a reversing means for turning over a document transported by the belt 66 is located. Specifically, the reversing means comprises a reversing roller 78 having a relatively large diameter, a pressing roller 80, and a reversing guide 82. Further, a switching pawl 84 is provided for switching the path along which a reversed document should follow, depending upon the copy mode, i.e, a double-face copy mode or a single-face copy mode.

The switching pawl 84 is rotatable about a shaft 84a. In a position indicated by a phantom line in FIG. 1, the pawl 84 is ready to direct a reversed document to between the belt 66 and the glass platen 12 again. In a position indicated by a solid line, the pawl 84 allows a reversed document to be collected on the platform 14 by way of roller pairs 86a, 86b, 86c and 86d, which serve as a third transport means, fourth guides 88 and 90, and discharge rollers 92. The roller pairs 86a to 86d are directly connected to the reversing roller 78 with respect to the drive. The discharge rollers 92 are driven by an exclusive DC motor and controllable in velocity to promote positive stacking of returned documents. Another function assigned to the rollers 92 is stiffening each document.

Hereinafter will be described power transmitting means which are associated with the respective rotary sections.

As shown in FIG. 6, a belt 93 is passed over a motor output shaft 94 and an intermediate wheel 96. A pulley 97 of the intermediate wheel 96 is operatively connected by a belt 99 to a pulley 101 of the separating roller 34 and a pulley 103 of the pull-out roller 44. The rotation of the pull-out roller 44 is transmitted by a belt 105 to the auxiliary rollers 50. Another friction wheel or gear (not shown) is rigidly mounted on the separating roller 34, the power of this wheel or gear being transferred by an intermediate wheel 98 to the feed roller 32.

A motor output shaft 100 is engaged with an intermediate wheel 102 which is provided with a pulley 107. A belt 109 is passed over the pulley 107 of the intermediate wheel 102 and a pulley 111 which is mounted on one of the discharge rollers 92, whereby the power of the motor output shaft 100 is transmitted to the discharge rollers 92.

During copying operation, a document is fed by the following sequence of steps.
(1) Procedure common to document through system and optical scan system (see FIGS. 1 and 5)

The lowermost one of documents which are loaded face up on the platform 14 is fed leftwardly downward by the feed roller 32. At this instant, the inlet Myler film 42 and brush roller 40 press the document to apply a transporting force to the document. Then, the lowermost document is separated from the others by the blocking belt 36 and, then, turned over by the separating roller 34 to be driven face down to the first guides 46 and 48. Further, the document is advanced by the pull-out rollers 44 and auxiliary rollers 50. Each of the rollers 32 and 34 is stopped after feeding the document to the pull-out rollers 44 by their one rotation and, thereafter, rotated following the movement of the document. Preferably, the peripheral speed of the separating roller 34 should be suppressed to lower than 500 millimeters per second in order to enhance positive separation. The sensor 52 soon senses the trailing end of the document. On the lapse of a predetermined period of time from the instant when the sensor 52 has sensed the trailing end of the document to the instant when the trailing end of the document is moved past the tongue 60, the motor output shaft 94 and, therefore, the auxiliary rollers 50 are rotated reversely resulting in the fact that the document abuts against the regist rollers 62, which are halted, to be thereby subjected to skew correction. At this instant, the pressing force exerted by the auxiliary rollers 50 is cancelled by a solenoid, not shown, to promote good skew correction.

The operation which follows the above differs from the document through system to the optical scan system and, therefore, will be described in relation to the individual systems sequentially.

(2) Document through system (see FIGS. 1 and 5)

On the lapse of several milliseconds since the abutment of the document against the regist rollers 62, the motor output shaft 70 is rotated to drive the document toward the glass platen 12. The document is advanced through the passage below the tongue 60 toward the third guides 57 and 58. Rotating at a low speed, the regist rollers 62 are synchronized by the regist sensor 64 to a transfer paper which is fed inside of the copier body. A belt pressing roller 104 is located inside of the belt 66 and in the vicinity of the drive pulley 68 so as to press the belt 66 against the glass platen 12. The position where the regist rollers 62 are located will hereinafter be referred to as a sheet through position P1. The optical unit for exposure, not shown, assumes a stand-by position below the glass platen 12 and at the sheet through position P1.

The document is fed face down by the belt 66 to the left while being pressed by the roller 104 against the glass platen 12 while, at the same time, sheet-through exposure is performed. It is to be noted that the speed of sheet feed effected by the belt 66 is about $\frac{1}{1.5}$ of the speed at which a document is fed into and out of the exposing station. The close contact of the document with the glass platen 12 effected by the roller 104 prevents irregular exposure, i.e., jitter. To further promote the prevention of jitter, an anti-fluctuation circuit may be built in the motor which has the output shaft 70, and the intermediate wheels 72, 74 and others may be implemented with gears. While the document is fed so, the pressing forces of the auxiliary rollers 50 are cancelled to free the document from a load which would otherwise prevent the document from being fed at a constant speed. As the sensor 52 senses the trailing end of the document, the motor having the output shaft 94 is energized again so that the lowermost document on the platform 14, like the first one, is separated, fed, turned over, switched back, and fed to the regist rollers 62. It is to be noted that the start of feed of the second document is so selected as to prevent the second document from colliding with the first document which is undergoing sheet through exposure.

The drive source assigned to the separating means and first transport means and the drive source assigned to the second transport means are independent of each other, as shown and described. This allows the belt 66 and the regist rollers 62 to be driven independently of each other. It follows that the interdocument distance and, therefore, the required period of time per copy can be reduced by selecting a minimum timing for the start of feed of the subsequent document. The document which has undergone exposure is turned over by the reversing roller 78, which is rotating clockwise, to be transported face up to the right by way of the switching pawl 84 and roller pairs 86a to 86d, until it becomes collected on the separating plate 18 on the platform 14 through the fourth guides 88 and 90 and discharge rollers 92.

The pressing force of the auxiliary rollers 50 cancelled as previously stated is recovered when the sensor 52 senses the leading end of the subsequent document. In this mode of operation, the motor having the output shaft 70 is speed-controllable to readily cope with variable-magnification copying.

(3) Optical scan type system (see FIGS. 1 and 5)

After the document has abutted against the regist rollers 62, the regist rollers 62 and the belt 66 are individually driven at high speed. As the regist sensor 64 senses the leading end of the document, an encoder which is built in the motor having the output shaft 94 starts counting pulses. When the number of pulses as counted by the encoder reaches a predetermined number, the motor is deenergized to interrupt the rotation of the belt 66 and, hence, the document is brought to a halt at the exposing station where the entire document surface faces the glass platen 12. Then, the optical unit already located at the home position, which is defined at the left end of the glass platen 12, is driven to the right away from the home position to scan the document. After the exposure, the optical unit is returned to the home position. On the other hand, the document which has undergone the exposure is collected on the platform 14 as in the previously stated document through system.

In a double-face copy mode, the switching pawl 84 is positioned as represented by a phantom line in FIG. 1. Under this condition, the document which is turned over by the reversing roller 78 is redirected downward by the pawl 84 toward the belt 66 and glass platen 12. Then, the belt 66 is driven in the other direction (counterclockwise in this particular embodiment) to bring back the document to the glass platen 12. After the document has been stopped at the predetermined exposing station, the optical unit is driven to scan the back of the document. Subsequently, the switching pawl 84 is restored to the solid-line position while, at the same time, the belt 66 is driven forward so as to allow the document to be returned to the platform 14 by way of the roller pairs 86a to 86d. To implement such a manner of document feed in the double-face copy mode, the motor having the output shaft 70 is reversible, and the belt 66 feeds the document in a reciprocal motion in response to the reversible rotation of the motor.

While the document is laid on the glass platen 12 in the double-face copy mode and subjected to exposure, the next document separated from the others waits in abutment against the regist rollers 62. This makes it possible to minimize the interdocument distance and, thereby, the copying time.

As described above, this particular embodiment is practicable with any of the document through system and the optical scan system. Further, it accommodates even double-face copying and enhances efficient production of copies.

The Second Embodiment

Figure 7:
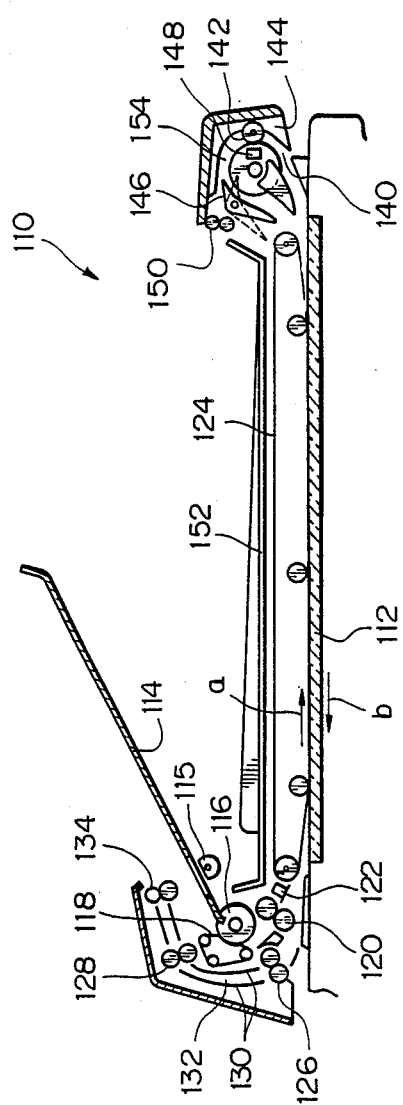
FIG. 7 is a sectional view side elevation of a second embodiment of an automatic document feeder in accordance with the present invention which is adaptive to double-face copying.

Referring to FIG. 7, one embodiment of a recycling automatic document feeder adaptive to double-face copying is shown. This document feeder, generally indicated by reference number 110, is mounted above a glass platen 112 of a copier.

Reference will first be made to FIG. 7 for describing the recycling operation in a single-face copy mode. As shown, a platform 114 to be loaded with documents is provided in the document feeder 110 in an inclined position. A stack of documents $O_1$ to $O_5$ are loaded in this sequence and face up on the platform 114. A feed roller 115 having a crescent-shaped configuration feeds the lowerst one $O_5$ of the stack of documents $O_1$ to $O_5$ out of the platform 114. The document fed from the platform 114 is separated from the other documents by a separating roller 116 made of elastic rubber whose coefficient of friction is about 1.2 to 1.4, and a separating belt 118 whose coefficient of friction is about 0.7 to 1.2. The separating belt 118 and the separating roller 116 in combination constitute a document separating section. Since such a separating section can be provided with a substantial separating range along the periphery of the roller 116, the separating pressure acting on a document is low, as compared to a separating means of the type using a friction pad and others which press against a separating roller. This effectively protects a document against a critical degree of rubbing.

The separating section, the feed roller 115 and others serve as an exemplary document separating and feeding device for separating and feeding documents one by one from the platform 114.

The document fed from the platform 114 is driven by a pair of feed rollers 120 to be laid in a predetermined document scanning position on the glass platen 112. The document scanning position is a position on a glass platen 112 where a document is to be scanned by an optical unit, not shown. The separating roller 116, separating belt 118 and rollers 120 function as an exemplary document reversing and transporting device which turns over a document and, then, transport it to the document scanning position on the glass platen 2.

As the leading end of the document coming out of the rollers 120 is sensed by a resist sensor 122, the drive transmission to the separating roller 116 is interrupted by an electromagnetic clutch, a spring clutch with a solenoid, or like means. Despite the interruption of the drive transmission mentioned above, the separating roller 116 is caused to idle while the document is not clear of the roller 116, due to a one-way clutch which is built in the roller 116. This reduces the load acting on the transport rollers 120. A belt 124 is adapted to transport a document on the glass platen 112. The drive of the belt 124 is implemented with a DC servo motor.

When the regist sensor 122 senses the trailing end of the document, a counter means installed in the servo motor starts counting pulses. As the count reaches a predetermined one, the servo motor is energized to interrupt the drive transmission to the belt 124 which is rotating as indicated by an arrow a. As a result, the document is brought to a halt at the document scanning position. On completion of scanning, the servo motor is reversely rotated to move the belt 124 in the opposite direction as indicated by an arrow b, whereby the document is discharged at the side where it has been introduced. The outgoing document is fed by transport rollers 126 and 128 and, while being turned over by a return passage as defined by guide plates 130, is collected on the platform 114 via outlet rollers 134.

Figure 8:
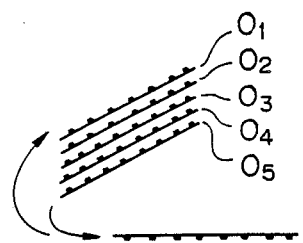
FIG. 8 is a schematic diagram useful for explaining the feed of single-face documents in relation to the document feeder of FIG. 7.

An arrangement is made such that on the start of reverse rotation of the belt 124, the drive transmission to the separating roller 116 and feed roller 115 is resumed. Then, the second original document $O_4$, FIG. 8, is fed out from the platform 114. In this case, since the return of the first document and the feed of the second document occur in an overlapping relation with respect to time, the number of copies obtainable per unit time and, therefore, the copying efficiency is enhanced.

The procedure described so far is repeated to complete reproduction of all of the copies $O_5$ to $O_1$, as shown in FIG. 8.

Figure 9:
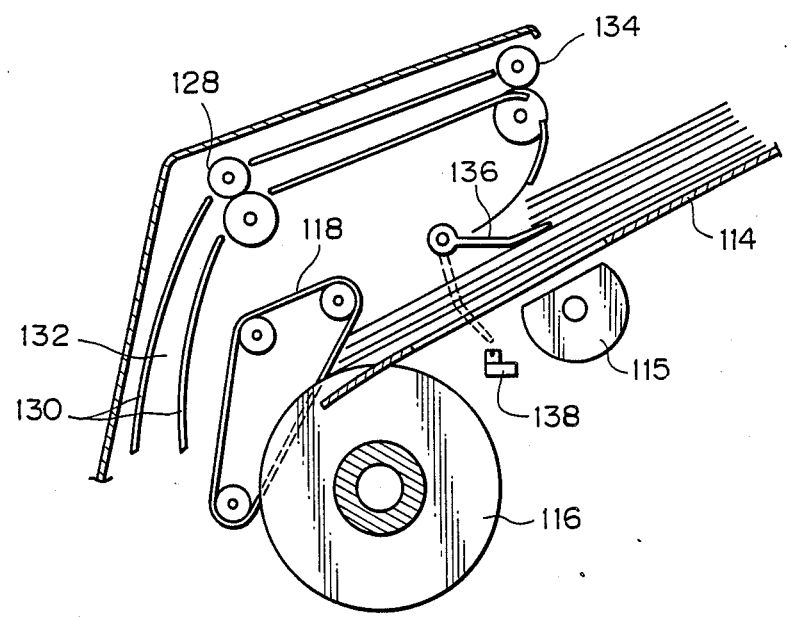
FIG. 9 is an enlarged view of a document separating and feeding section.

As shown in FIG. 9, the document fed out by the discharge roller 134 is separated by a separating plate 136 from those documents which have not been copied yet (copies located below the plate 136 which is in a position indicated by a solid line). As the entire stack of documents have been copied, the separating plate 136 is rotated by gravity to a position which is indicated by a solid line. Such a position of the separating plate 136 is sensed by a sensor 138. In response to the resulting output of the sensor 138, the stack of documents are recycled for another copying operation. That is, a desired number of copying operations are performed with the same stack of documents. The subsequent copying as mentioned above will hereinafter be referred to as recycle copying for convenience.

Next, the recycling operation will be described in relation to a double-face copy mode. A document reversing section which is made up of a reversing roller 140, a roller 142 coactive with the reversing roller 140, a guide plate 144 and other structure is located at the right-hand side of the belt 124. In a double-face copy mode, the lowermost document on the platform 114 is fed to the belt 124 and the glass platen 112 and, therethrough, to a position between the reversing roller 140 and the roller 142. The rollers 140 and 142 and the guide plate 144 cooperate to turn over the document. In the double-face copy mode, a switching pawl 146 located at the left-hand side of the reversing roller 142 is held in a position indicated by a solid line. In this condition, the pawl 146 guides the reversed document back to the glass platen 112.

Figure 10:
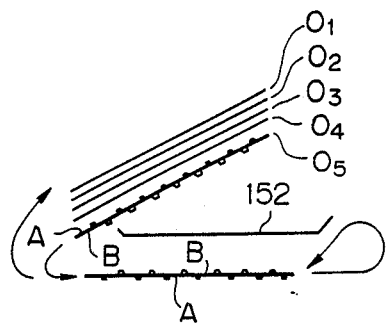
FIG. 10 is a schematic diagram useful for explaining the feed of double-face documents in relation to the document feeder of FIG. 7.

After the rotation in the direction a, the belt 124 is rotated in the direction b to transport the reversed document along the glass platen until the document reaches the document scanning position. Specifically, as shown in FIG. 10, while the lowermost document $O_5$ fed from the platform 114 is moved along the glass platen 112, the surface A of the document is oriented downward toward to face the glass platen 112; when it is stopped in the document scanning position on the glass platen 112 after the reversal, the surface B is oriented downward and copied. The procedure of feeding a document on the glass platen 112 without copying it and, then, copying the surface B first as stated above is to collate the copies produced.

As the document is passed between the reversing roller 140 and the roller 142 until its trailing end has been sensed by the sensor 148, the counter means of the servo motor starts counting pulses. When the number of pulses as counted by the counter means reaches a predetermined one, the motor is deenergized. This interrupts the rotation of the belt 124 to hold the document in the document scanning position on the glass platen 112. Thereafter, the surface B of the document $O_5$, FIG. 10, is scanned and, then, the belt 124 is driven again in the direction a to advance the document to between the reversing roller 140 and the roller 142. After being turned over by the coactive rollers 140 and 142, the document is transported again to the glass platen 112.

On the glass platen 112, the surface A of the document $O_5$ is scanned. Then, the belt 124 is rotated in the direction b to transport the document $O_5$ to the return passage 132. Consequently, the document $O_5$ is turned over and, then, collected on the platform 114 with its surface A facing upward. This is the end of double-face copying of the lowermost double-faced document $O_5$. The same sequence of steps are repeated with each of the other documents $O_4$, $O_3$, $O_2$ and $O_1$ to produce double-faced copies thereof. This is followed by the recycle copying with such same stack of documents.

While this particular embodiment has been shown and described in relation to recycle copying which uses a single-faced and a double-faced document, it is also operable in an ADF mode in which the recycle copying is not performed. Such an ADF mode is desirable when, for example, use is made of worn-out documents or thin documents. Specifically, in the ADF mode, the switching pawl 146 shown in FIG. 7 is positioned as represented by a phantom line so that each document, whether it be single-faced or double-faced, undergone the final scanning is moved through between the reversing roller 140 and the roller 142 toward the switching pawl 146 while being turned over by the rollers 140 and 142. The pawl 146 in the phantom-line position guides the document toward the discharge rollers 150 which in turn discharges the document directly to a tray 152, which is independent of the platform 114. The reference numeral 154 designates a discharge passage adapted to guide the document coming out of the glass platen 112 to the tray 152.

In the ADF mode, as in the previous recycle copy mode, at the instant when the belt 124 begins to rotate after a document has been scanned, the feed of the next document is initiated. When this subsequent document is stopped at the document scanning position, the previous document is ready to be forcibly discharged to the tray 152 by the rollers 140, 150 and others. By the procedure described above, the copying efficiency is improved.

Figure 11:
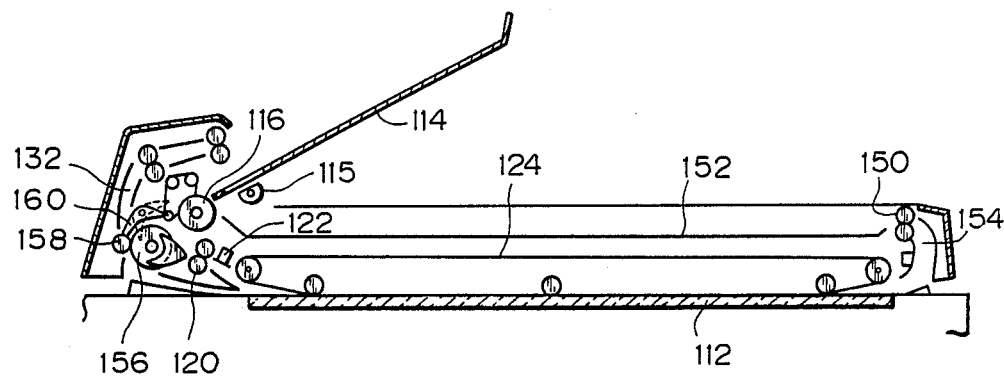
FIG. 11 is a sectional view side elevation of a third embodiment of the present invention.

Referring to FIG. 11, another embodiment of the present invention is shown in which the document reversing section for reversing a document in a double-face copy mode is located at the document feed side. This embodiment is similar to the previous one in that the document reversing section includes a reversing roller 156, a roller 158, a switching pawl 160 and others, and in that a single-faced and a double-faced document may be selectively copied in a mode with or without recycle copying. However, in this particular embodiment, the distance which a document fed from the platform 114 and reversed travels from the point where its trailing end is sensed by the regist sensor 122 to the document sensing portion is shorter than in the previous embodiment by the amount of idle feed of the latter. This frees a document from cumulation of slippage during transport and, thereby, surely stops it at the document scanning position.

Figure 12:
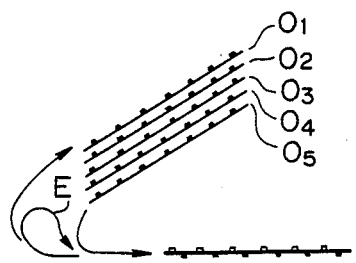
FIG. 12 is a schematic diagram useful for explaining the feed of documents as performed by the document feeder of FIG. 11.

Nevertheless, in the embodiment of FIG. 7, too, a reversed document may be returned to the regist sensor 122 and, then switched back for the purpose of increasing the regist accuracy of a document. FIG. 12 shows the pattern of document feed in accordance with the embodiment of FIG. 11; in a double-face copy mode, each document is reversed as indicated by an arrow E.

As described above, a document reversing section adapted to guide a document to a glass platen while turning it over is built in the automatic document feeder. This eliminates the need for a complicated document transport loop and, thereby, promotes minuaturization of the document feeder and efficient document transport. Since whether or not to perform recycle copying is open to choice, thin documents, worn-out documents and others which preferably should not be subjected to recycle copying can be directly discharged to an exclusive tray, in which case the resultant copies may be recycled. The efficient copying is further enhanced because the feed and the discharge of documents occur in an overlapping relation.

Figure 13:
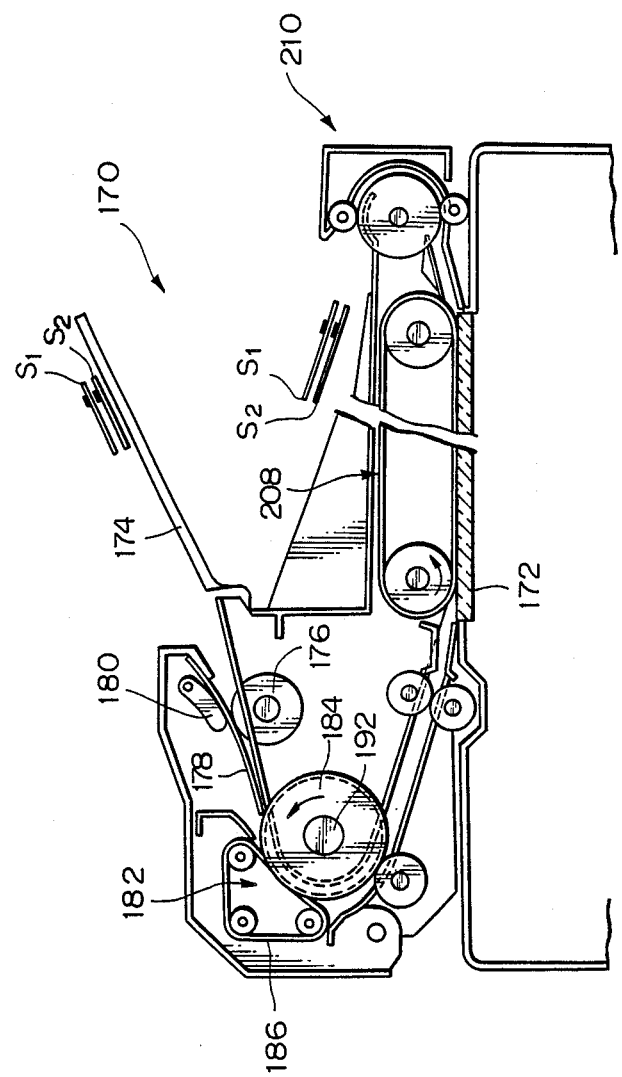
FIG. 13 is a sectional view side elevation showing a fourth embodiment of the automatic document feeder in accordance with the present invention.

Referring to FIG. 13, another embodiment of the automatic document feeder in accordance with the present invention is shown. As shown, an automatic document feeder 170 of this embodiment is mounted above a glass platen 172. The automatic document feeder 170 includes a platform 174 to be loaded with a document or a stack of documents, a crescent-shaped roller 176, a film 178 adapted to press a document, and a member 180 for pressing the film 178 against the roller 176. While the truncated section of the crescent-shaped roller 176 usually faces the document side, it in response to a sheet feed command is brought into contact with a document to feed it toward a separating section 182.

Figure 14:
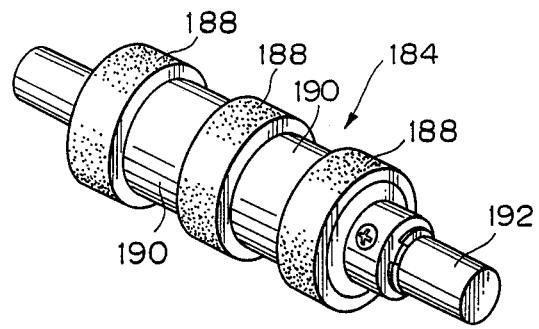
FIGS. 14 and 15 are respectively a perspective view and a sectional view of a reversing roller.
Figure 15:
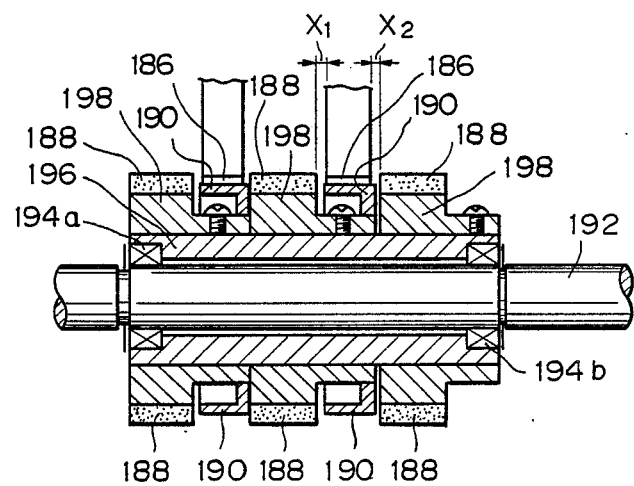

The separating section 182 includes a reversing roller 184, and a blocking belt 186 which makes contact with the reversing roller 184. As shown in FIGS. 14 and 15, the reversing roller 184 is made up of rubber roller portions 188 having a relatively large coefficient of friction, and smooth roller portions 190 produced by, for example, precision-finishing metal or the like and having a relatively small coefficient of friction. The rubber roller portions 188 are slightly large in diameter than the smooth roller portions 190, e.g., by about 0.3 to 1 millimeter. A small clearance is defined between each rubber roller portion 188 and the neighboring smooth roller portions 190. The rubber roller portions 188 and the smooth roller portions 190 are arranged alternately; in this particular embodiment, three rubber roller portions 188 and two smooth roller potions 190 are provided.

Figure 16:
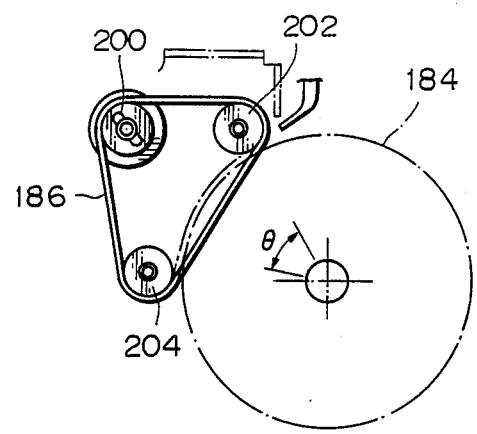
FIGS. 16 and 17 are respectively a front view and a sectional view of blocking belts.

As best shown in FIG. 15, the reversing roller 184 is provided with a support sleeve 196 to which a rotary drive shaft 192 is connected through one-way clutches 194a and 194b. A plurality of, three in this embodiment, stepped roller members 198 are fastened to the support sleeve 196 by screws and others. Rubber rings are fitted on larger diameter portions of the individual roller members 198 to serve as the rubber roller portions 188. Likewise, rubber rings are fitted on smaller diameter portions of the individual roller members 198 between the larger diameter portions, serving as the smooth roller portions 190. If desired, one of the one-way clutches 194a and 194b may be replaced with a bearing. The blocking belt 186 comprises two independent endless strips each making contact with a respective one of the smooth roller portions 190 of the reversing roller 184. The two blocking belts 186 are passed over shafts 200, 202 and 204 to constitute a single unit. As shown in FIG. 16, it is preferable that the shafts 202 and 204 be spaced by as great a distance as possible from each other to allow each belt 186 to wrap around the roller 184 over a substantial angle $\theta$, and to maintain the pressure force exerted by the belts 186 to the roller 184 relatively small.

Figure 17:
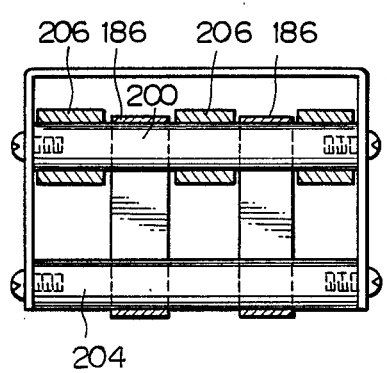

The width of each blocking belt 186 is selected to be equal to or slightly smaller than that of each smooth roller portion 190. Each belt 186 is positioned such that when brought into contact with the smooth roller portion 188, the belt 186 is spaced from the nearby rubber roller portions 188 by distances $x_1$ and $x_2$. As shown in FIG. 17, such positioning may be implemented with sleeves 206 which are rigidly mounted on the shaft 200 to position the belts 186. It is to be noted that the distances $x_1$ and $x_2$ may be equal to or slightly different from each other and, preferably, about 0.5 to 1.5 millimeters each.

In operation, a stack of documents are loaded on the platform 174 deep enough to reach the crescent-shaped roller 176. In response to a sheet feed command, the roller 176 is rotated to feed one of the documents, which is pressed against the roller 176 by the member 180 through the film 178, to the separating section 182. The separating section 182 is constructed to surely feed the documents one at a time toward the following transporting section 208, as described in detail. When, for example, two documents $S_1$ and $S_2$ are fed at the same time to the separating section 182, the lower document $S_2$ which should be fed abuts against the reversing roller 184 while the upper document $S_1$ abuts against the blocking belts 186. In this condition, although the lower document $S_2$ is reversed in the clockwise direction and fed toward the transporting section 208 by the reversing roller 184, the upper document $S_1$ is retained by the blocking belts 186. The document $S_2$ is scanned at the transporting section 208, then turned over again by a reversing and discharging section 210, and then stacked on the platform 174 again. In this construction, while the documents $S_1$ and $S_2$ are copied in the reverse order with respect to the page number, they are advantageously stacked in the original condition after copying. Such, however, does not constitute any essential part of the present invention and, therefore, will not be described any further.

Besides the positive separation, i.e., prevention of simultaneous feed of more than one documents, various other advantages are attainable with this particular embodiment. Specifically, the automatic document feeder 170 holds the blocking belts 186 in contact with the reversing roller 184 over a substantial angular distance. This angular distance of contact is further increased because the reversing roller 184 is provided with a substantial diameter for turning over a document. Such an angular distance available for separation proportionally reduces the pressure force which the blocking belts 186 should exert on the reversing roller 184, so that a document is prevented from becoming dirty or being damaged.

Figure 18:
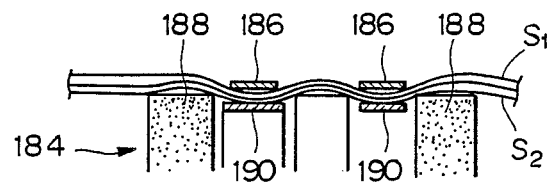
FIG. 18 is a view representative of a separating condition.

Further, in this embodiment, the reversing roller 184 exerts a great transporting force despite the relatively weak pressing forces available with the blocking belts 186. Specifically, as shown in FIG. 18, the documents $S_1$ and $S_2$ nipped between the reversing roller 184 and the blocking belts 186 are caused to undulate due to the difference in diameter between the rubber roller portions 188 and the smooth roller portions 190 and, in addition, they are bent along the periphery of the roller 184. Hence, the transporting force exerted by the reversing roller 184 is sufficiently transferred to the document $S_2$ to eliminate jamming or simultaneous feed of more than one document, even if the documents are relatively thick. Furthermore, since the blocking belts 186 each makes contact with its associated smooth roller portion 190 of the reversing roller 184, the wear of the belts 186 is remarkably suppressed even though the roller 184 may be rotated before the arrival of a document or after the passage of the same.

If desired, the blocking belts 186 may be driven in the opposite direction to the direction of document feed. In a construction wherein the blocking belts 186 are unmovable, opposite ends of the belts 186 may be fixed to the shafts 202 and 204 of the above embodiment. It is to be noted that this embodiment is applicable not only to a document feeder but also to other various kinds of sheet feeding apparatus.

As described above, this embodiment is capable of surely separating and feeding various kinds of sheets with no regard to the thickness of the sheets and, yet, prevents the sheets from jamming or being damaged.

Hereinafter will be described a photoconductive element or like image carrier installed in a copier or the like to which an automatic document feeder of the present invention is applicable.

Generally, a photoconductive drum or like image carrier for carrying an electrostatic and a toner image installed in an electrographic recording apparatus, which uses an electrostatographic process, such as a printer or a facsimile apparatus is mounted in the body of the apparatus independently of the others. In this case, a photoconductive drum is mounted in the apparatus body by inserting a guide member in the drum, mounting a flange and a bearing at both ends of the guide member, attaching a front side panel, and positioning the assembly relative to a front side panel of the apparatus body. This is not only time- and labor-consuming but also apt to damage the peripheral surface of the drum, which is entirely exposed to the outside, due to a charger, a developing unit, a transfer and a separator charger, a cleaning unit, a discharger, and other various process implements which are arranged around the drum. Further, while in distribution, the photoconductive drum which is bare has to be stored in a solid box or like special container.

In the light of the above, there has been proposed a single cartridge which accommodates therein a photoconductive drum and a part of the process implements arranged therearound, e.g., a charger, a developing unit, a cleaning member, and a container for collecting toner removed by the cleaning member, for the purpose of facilitating handling of the drum. Such a cartridge is bodily replaceable with another. Although this kind of configuration may promote the ease of handling of a photoconductive drum, it adds to the running cost partly because the life of a drum and those of the other various implements are different and partly because, once any of the structural elements fails, the entire cartridge has to be disposed of despite that the other devices and elements are still usable.

Figure 19:
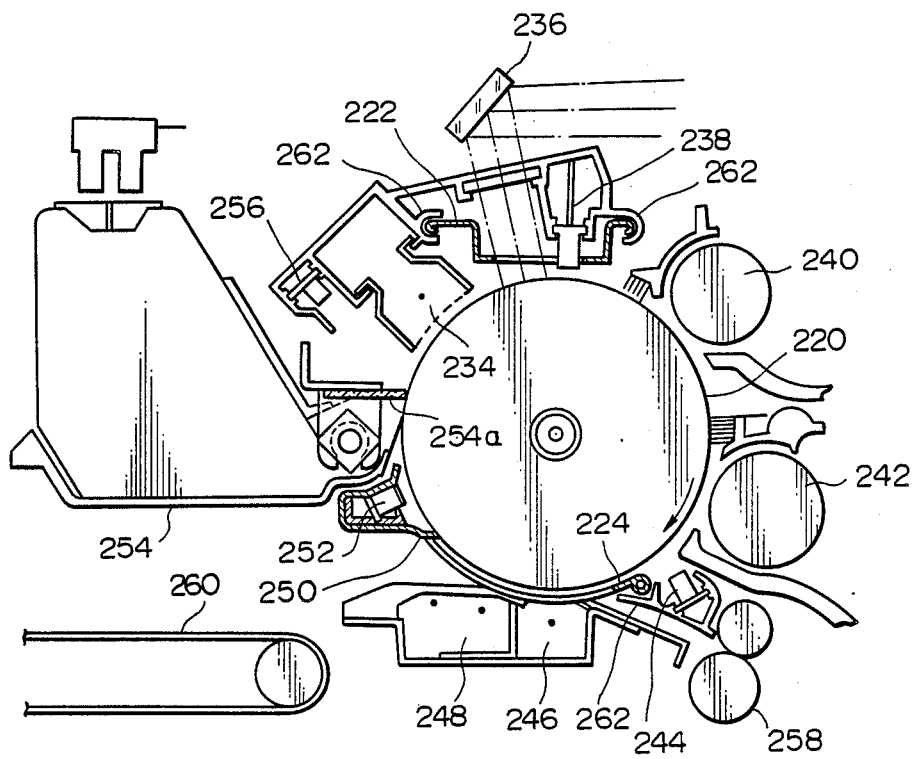
FIG. 19 is a sectional view showing a photoconductive element unit in accordance with a fifth embodiment of the present invention together with various implements which are arranged around the photoconductive element unit.

Referring to FIG. 19, a photoconductive element unit in accordance with the present invention is shown and includes a photoconductive unit 220 and a framework adapted to support the drum 220 rotatably at opposite ends of the drum 220. The framework is made up of an upper frame 222, a lower frame 224, a front panel 226, and a rear panel 228 which are integrally connected to each other. The drum 220 has a front end surface which is molded integrally with a cylindrical surface of the drum 220, a central projection rotatably supported by a bearing 230 which is provided at the center of the front panel 226, and a flange 232 which is rotatably supported by the rear panel 228. The framework is bodily attached to and detached from the apparatus body with the drum 220 rotatably supported.

As shown in FIG. 19, a charger 234, an exposing device 236, an eraser 238, developing devices 240 and 242, a pre-transfer exposing LED (light-emitting diode) 244, a transfer charger 246, a separator charger 248, a separator pawl 250, a toner density sensor 252, a cleaning device 254 including a cleaning blade 254a, and a discharging LED 256 are sequentially arranged around the drum 220 in this order in an intended direction of rotation of the drum 220 as indicated by an arrow, as in an ordinary electrostatographic recording apparatus. A paper fed by regist rollers 258 at a predetermined timing to a transfer station which is defined between the drum 220 and the transfer charger 246 is separated by the separator charger 248 and pawl 250 from the drum 220 and, then, transported by a belt 260 to a fixing device. The apparatus is assumed to comprise a two-color copier and, therefore, the developing units 240 and 242 store developers which are different in color from each other. The toner density sensor 252 and pawl 250 are mounted on the lower frame 224.

Figure 20:
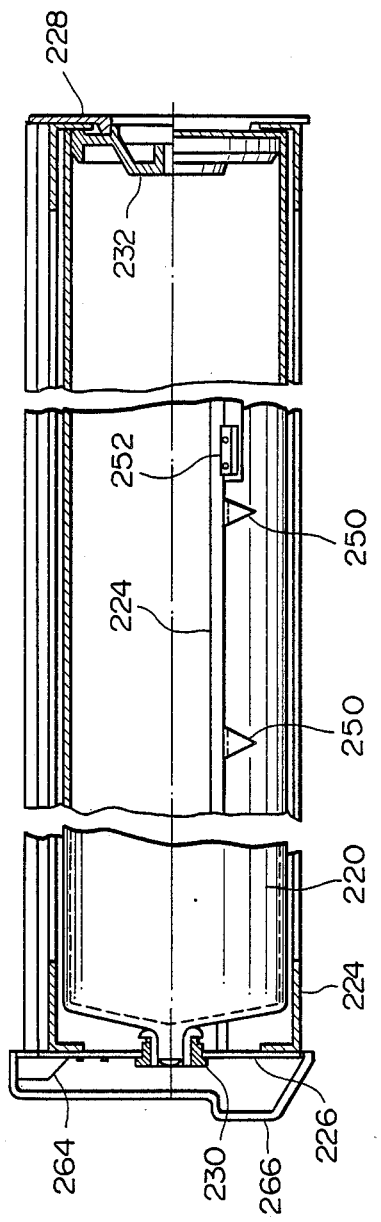
FIG. 20 is a vertical sectional view of the photoconductive element unit as shown in FIG. 19.

The frames 222 and 224 of the photoconductive element unit are inserted into the apparatus body with their guide portion slidably mated with a guide rail 262 which is mounted on the apparatus body, whereby the front panel 226, FIG. 20, is positioned relative to that of the apparatus. In this condition, a drive shaft, not shown, which protrudes forward from a rear panel of the apparatus body is mated with a bore which is provided in a central part of the flange 232 of the drum 220, thereby positioning the rear portion of the drum 220. In FIG. 20, the reference numeral 264 designates a leaf spring for grounding, and 266 a cover.

The positional configuration and the dimensions of openings of the frames 222 and 224 are designed such that when the unit is positioned as stated above, the drum 220 cooperate with the various process implements which are arranged therearound. Specifically, the upper frame 222 is disposed between the charger 234 and the developing device 240 and open in its portions which correspond to an exposing optical path and the eraser 238. The lower frame 224, on the other hand, is disposed between the pre-transfer LED 244 and the cleaning unit 254 and open in its portion which covers the transfer and separator chargers 246 and 248.

As stated above, the drum 220 is rotatably supported by the frames 222, 224, 226 and 228 at the upper and lower portions and both end portions thereof while the unit is bodily removable with those frames slidably mated with the guide 262. Hence, the unit is mounted and dismounted while being generally positioned by its framework. This prevents the drum 220 from being damaged by the surrounding process implements. Even after the drum 220 has been removed from the apparatus body, it is protected by the framework of the unit and, therefore, may be relatively freely put in a desired place.

In the construction described above, it is needless for the drum 220 to be supported by a guide member within the drum and for the guide member to be journalled to the apparatus body. This, coupled with the fact that the drum 220 has one end face thereof which is molded integrally with the cylindrical surface, cuts down the number of machining and assembling steps.

The frames stated above may be implemented with a molding of resin in order to further reduce the number of structural elements. Covers may be provided for closing the openings of the frames as well as the exposed portions between the upper and lower frames. Such allows the whole drum to be covered and, therefore, treated with ease during distribution.

In addition, the photoconductive element unit of the present invention does not include any process implement and, therefore, eliminates the disposal of structural devices and elements which are still usable, thereby cutting down the running cost.

As described above, in accordance with this embodiment, the ease of handling of a photoconductive drum and other image carriers during attachment to and detachment from an apparatus body as well as during distribution is promoted to reduce the running cost. Further, the support structure adapted to support a photoconductive element is simplified.

Various modifications will become possible for those skilled in the art after receiving the teachings of the present disclosure without departing from the scope thereof.

What is claimed is:

1. A recycling automatic document feeder comprising:
    (a) a platform which, in use, is loaded with a stack of documents each of which has a first side which initially faces said platform and a second side which initially faces away from said platform;
    (b) a platen having a planar working surface;
    (c) first means for sequentially separating the bottom document in a stack of documents located on said platform;
    (d) second means for turning over each document received from said first means and for feeding it to an intermediate stop section;
    (e) an endless belt sized, shaped, and positioned to feed each document across said platen with a surface in planar contact with said planar working surface of said platen, said endless belt and said platen having a first nip at one end and a second nip at the other end;
    (f) third means for feeding each document from said intermediate stop section to said first nip so that the second surface of each document comes into planar surface contact with said planar working surface of said platen;
    (g) a reversing roller to which each document is fed from said second nip and about which each document is passed with its second surface facing said reversing roller;
    (h) fourth means adjacent said reversing roller for feeding documents received from said reversing roller back to said platform such that the first side of each document faces said platform and for depositing each document on top of the remaining stack of documents or on top of said platform itself; and
    (i) fifth means adjacent said reversing roller for feeding each document either to said fourth means or back to said second nip such that the first surface of each document comes into planar surface contact with said planar working surface of said platen.

2. A recycling automatic document feeder as recited in claim 1 and further comprising sixth means for sensing when the last document in a stack located on said platform has been fed forward from said platform.

* * * * *